(12) United States Patent
Kars

(10) Patent No.: US 10,947,645 B2
(45) Date of Patent: Mar. 16, 2021

(54) YARN, FABRIC AND MANUFACTURING METHOD THEREOF FOR SCREENING APPLICATIONS

(71) Applicant: KUCUKCALIK TEKSTIL SANAYI VE TICARET ANONIM SIRKETI, Inegol/Bursa (TR)

(72) Inventor: Muzaffer Kars, Inegol/Bursa (TR)

(*) Notice: Subject to any disclaimer, the term of this patent is extended or adjusted under 35 U.S.C. 154(b) by 383 days.

(21) Appl. No.: 15/736,609

(22) PCT Filed: Nov. 13, 2015

(86) PCT No.: PCT/TR2015/050175
§ 371 (c)(1),
(2) Date: Dec. 14, 2017

(87) PCT Pub. No.: WO2016/204703
PCT Pub. Date: Dec. 22, 2016

(65) Prior Publication Data
US 2018/0187341 A1    Jul. 5, 2018

(30) Foreign Application Priority Data

Jun. 17, 2015    (TR) .................................. 2015 07441

(51) Int. Cl.
*D02G 3/36*        (2006.01)
*D02G 3/44*        (2006.01)
(Continued)

(52) U.S. Cl.
CPC ............... *D02G 3/36* (2013.01); *D02G 3/443* (2013.01); *D03D 15/00* (2013.01); *D03D 15/12* (2013.01);
(Continued)

(58) Field of Classification Search
CPC .......... D02G 3/36; D02G 3/443; D03D 15/00; D03D 15/12; E06B 9/24; D10B 2401/041;
(Continued)

(56) References Cited

U.S. PATENT DOCUMENTS

2007/0049151  A1*  3/2007  Chao ...................... D02G 3/36
                                                            442/243
2010/0151756  A1   6/2010  Kim
(Continued)

FOREIGN PATENT DOCUMENTS

EP    2 199 441       6/2010
EP    2 261 405       12/2010
WO    2013/041524     3/2013

OTHER PUBLICATIONS

International Search Report issued in PCT/TR2015/050175, dated Apr. 6, 2016.
(Continued)

*Primary Examiner* — Clinton T Ostrup
*Assistant Examiner* — Andrew Wayne Sutton

(57) ABSTRACT

The invention relates to a yarn (1) for screening applications, especially for screening applications preventing solar heat while transmitting solar light, a fabric obtained from the yarn, and a manufacturing method thereof. The yarn (1) consists of at least one polyester outer yarn (5) wound on a polyester core yarn (2). The manufacturing method keeps the core and outer yarns at certain temperatures for certain durations after the core and outer yarns have been twisted.

15 Claims, 2 Drawing Sheets

(51) Int. Cl.
    *D03D 15/00*    (2021.01)
    *D03D 15/12*    (2006.01)
    *E06B 9/24*     (2006.01)

(52) U.S. Cl.
    CPC ............ *E06B 9/24* (2013.01); *D10B 2331/04* (2013.01); *D10B 2401/041* (2013.01); *D10B 2401/22* (2013.01); *D10B 2505/18* (2013.01)

(58) Field of Classification Search
    CPC ............ D10B 2331/04; D10B 2401/22; D10B 2505/18
    See application file for complete search history.

(56) References Cited

U.S. PATENT DOCUMENTS

| | | |
|---|---|---|
| 2010/0317248 A1 | 12/2010 | Chang et al. |
| 2015/0059239 A1 | 3/2015 | Andersson et al. |
| 2018/0187341 A1* | 7/2018 | Kars ................... D02G 3/36 |
| 2018/0347079 A1* | 12/2018 | Shimada ............. D02G 3/047 |
| 2019/0015192 A1* | 1/2019 | Nakazawa ............. D01D 5/088 |
| 2019/0301058 A1* | 10/2019 | Shimizu ............. H01B 13/0036 |
| 2020/0063299 A1* | 2/2020 | Tanaka ................. A41D 13/002 |

OTHER PUBLICATIONS

International Preliminary Report on Patentability issued in PCT/TR2015/050175, completed Oct. 10, 2017.

* cited by examiner

YARN, FABRIC AND MANUFACTURING METHOD THEREOF FOR SCREENING APPLICATIONS

TECHNICAL FIELD

This invention relates to a yarn for screening applications, especially for screening applications which prevent solar heat while transmitting solar light, in other words, which arrange light and thermal transmittances, and relates to a fabric, which is obtained from the yarn, and relates to a manufacturing method thereof.

PRIOR ART

The use of various fabrics in the interior and exterior walls of the building is known for the prevention of solar heat while transmitting solar light. Fabrics for this use are generally manufactured from a blend of glass fibers and the PVC yarn. Since this yarn is obtained by coating a glass fiber core yarn with the PVC, screening fabric has an artificial appearance and the shape and size of the fabric can change in time. In addition, since the PVC is under environmental conditions, not only bad odor is formed but also the fabric is short-lasting in time. The weight of fabric, which is obtained from a yarn comprising glass fiber, becomes high and therefore the installation is more difficult and costly.

As a different and specific polyester yarn that is manufactured by advanced technology is used in the product and method of the invention, it is a hundred percent fabric and a natural appearance is formed. Touch and appearance difference between products that are manufactured in other techniques is evident.

OBJECTIVES AND BRIEF DESCRIPTION OF THE INVENTION

This invention aims to develop a yarn and a fabric obtained from this yarn for screening in order to ensure
  Not to change shape and sizes of the product in time,
  Not to form bad odors,
  To be long lasting, and
  To obtain natural appearance thanks to not comprising the PVC.

For the purpose of this invention, a yarn, which consists of at least one polyester outer yarn that is wound on a polyester core yarn, and a manufacturing method, which provides keeping core and outer yarns at certain temperatures for certain durations after their combination by a technique specific to the invention for manufacturing this yarn, are developed. Also with this invention a fabric, which is obtained from mentioned yarn, and a method for weaving mentioned yarn using taking double weft method in order to obtain this fabric are developed.

DESCRIPTION OF FIGURES ILLUSTRATING THE INVENTION

Figures and related descriptions used for a better description of the invention are as follows.

DESCRIPTION OF COMPONENTS OF THE INVENTION

Figure 1:
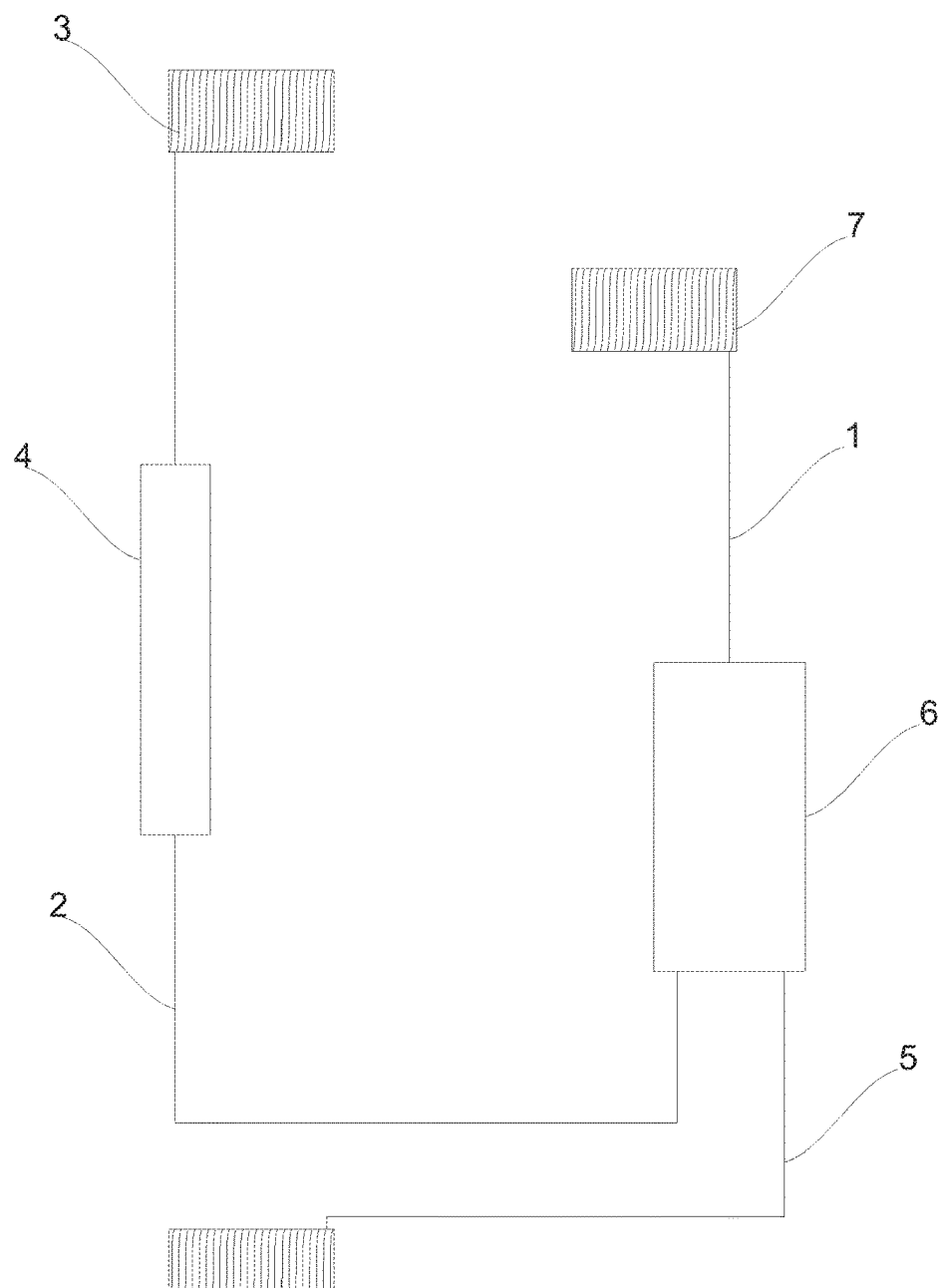
FIG. 1 is a schematic view of a twisting machine manufacturing a yarn according to the invention.
Figure 2:
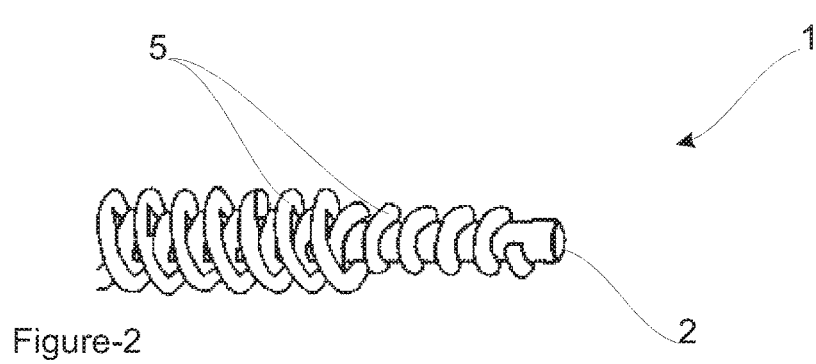
FIG. 2 is a schematic sectional view of a yarn according to the invention.
Figure 3:
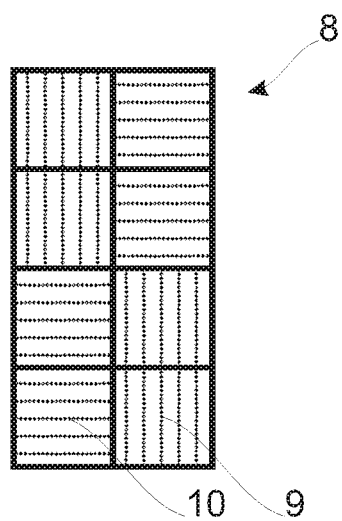
FIG. 3 is a schematic view of a weaving pattern of a fabric according to the invention.
Figure 4:
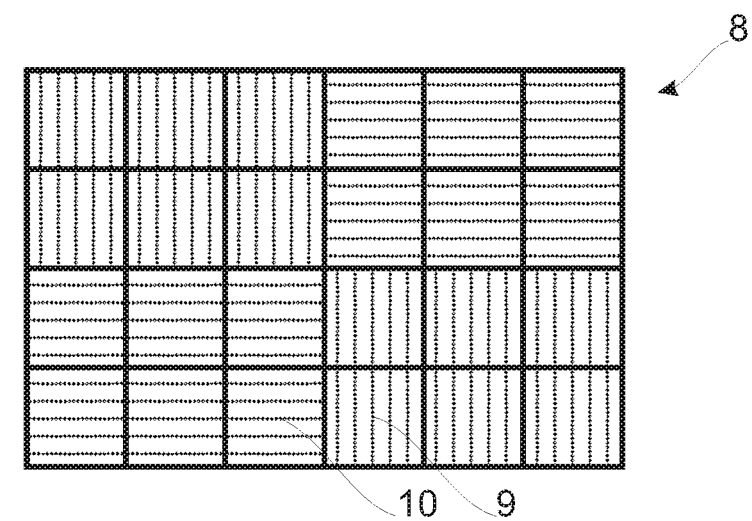
FIG. 4 is a schematic view of a weaving pattern of other fabric according to the invention.
Figure 5:
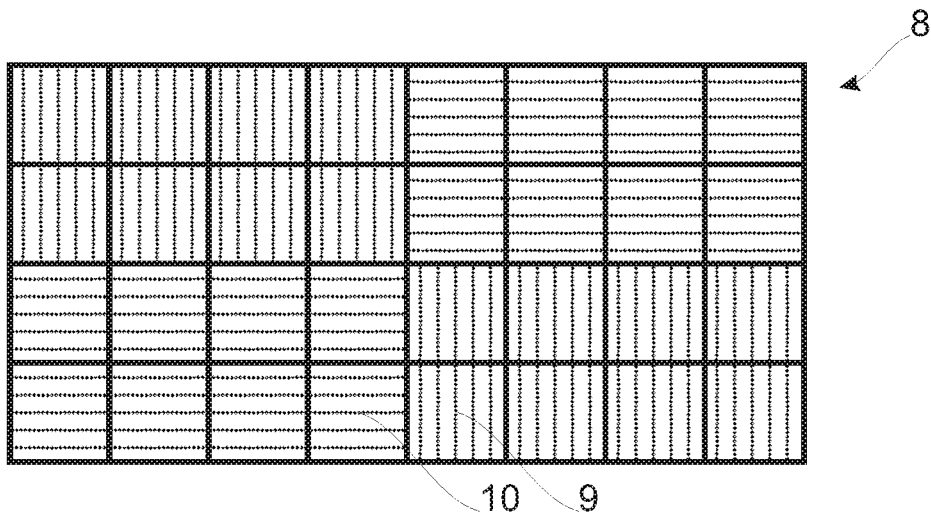
FIG. 5 is a schematic view of a weaving pattern of another fabric according to the invention.
Figure 6:
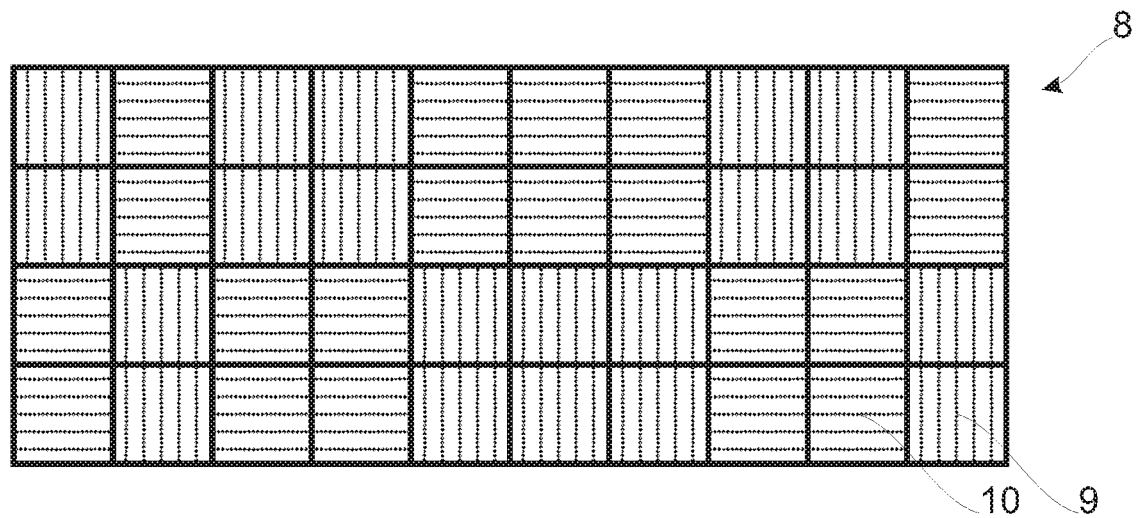
FIG. 6 is a schematic view of a weaving pattern of another fabric according to the invention.

The components in the figures are each given a reference number and these numbers refer to the following:
1. Yarn
2. Core yarn
3. Creel
4. Tension apparatus
5. Outer yarn
6. Spindle
7. Bobbin
8. Fabric
9. Warp
10. Weft

DETAILED DESCRIPTION OF THE INVENTION

A yarn (1) for screening applications of the invention comprises a polyester core yarn (2) and at least one polyester outer yarn (5) that is wound on this polyester core yarn. The melting temperature of the outer yarn (5) is lower than the melting temperature of the core yarn (2).

The yarn (1) for screening applications is obtained by following steps:
  (101) drawing a core yarn (2) from a creel (3) with a tension between 44 to 48 gr provided by a tension apparatus (4),
  (102) winding an outer yarn (5) on the core yarn (2) by passing the core yarn (2) and the outer yarn (5) through a spindle (6),
  (103) winding the core yarn (2) that emanates from the spindle (6) and the outer yarn (5) that is wound on the core yarn (2) on a bobbin (7) by pulling with a tension between 8 to 10 gr,
  (104) placing the bobbin (7) in a fixing machine
  (105) keeping the bobbin (7) under −700 mmHg relative pressure between 10 to 20 minutes, preferably 15 minutes,
  (106) increasing the temperature of the bobbin (7) to a temperature between 80 to 90° C., preferably 85° C., in 15 minutes,
  (107) keeping the bobbin (7) at this temperature between 40 to 50 minutes, preferably 45 minutes,
  (108) keeping the bobbin (7) under −700 mmHg relative pressure between 25 to 35 minutes, preferably 30 minutes.

During temperature raise at the $106^{th}$ step, the pressure also raises freely due to the effect of temperature changes. During pressure reduction at the $108^{th}$ step, the temperature drops freely.

The yarn (1) is manufactured as preferably 750 denier or 1250 denier. A spindle (6) is worked so as to give 900 rounds s twist for 750 denier yarn (1) while it is worked so as to give 600 rounds s twist for 1250 denier yarn (1). For 750 denier yarn (1), a core yarn (2), which is composed of 300 denier (96 filaments) textured semi-dull and 150 denier (48 filaments) textured semi-dull yarns in a folded state, and an outer yarn (5), which is 150 denier (48 filaments) semi-dull FDY (fully drawn yarn), are used. As for 1250 denier yarn (1), 900 denier textured core yarn (2) and 150 denier FDY are used.

A bi-component conjugated yarn (1) is obtained by this method.

A yarn (1) can comprise more than one outer yarn (5). In this case, outer yarns (5) are wounded respectively on one another outwards from the inside and as s and z twisted alternating from inside to outside with the innermost being s twisted.

A fabric (8) for screening applications is obtained by following steps:
(201) drawing a warp (9) using the yarn (1),
(202) weaving draft the warp (9),
(203) inserting double weft (10) (Panama weft) using the yarn (1).

The fabric (8) can allow solar light to be transmitted at a level sufficient to illuminate the environment thanks to inserting weft (10) in pairs while ensuring that solar heat is prevented.

Warp (9) and weft (10) frequencies are set such that there are preferably 16 yarns (1) in each centimeter in the event that 750 denier yarn (1) is used in the fabric (8), and there are preferably 14 yarns (1) in each centimeter in the event that 1250 denier yarn (1) is used in the fabric (8).

Fabrics (8) with different heat and light transmittances can be manufactured by changing warp and weft frequencies of the fabric (8) obtained according to the invention.

The invention claimed is:

1. A manufacturing method of a yarn (1) for screening applications, characterized by the process steps:
drawing a polyester core yarn (2) from a creel (3) with a tension between 44 to 48 gr provided by a tension apparatus (4),
winding an outer yarn (5) on the core yarn (2) by passing the core yarn (2) and at least one polyester outer yarn (5), whose melting temperature is lower than the melting temperature of the core yarn (2), through a spindle (6),
winding the core yarn (2) that emanates from the spindle (6) and the outer yarn (5) that is wound on the core yarn (2) on a bobbin (7) by pulling with a tension between 8 to 10 gr,
placing the bobbin (7) in a fixing machine,
keeping the bobbin (7) under 700 mmHg vacuum between 10 to 20 minutes,
increasing the temperature of the bobbin (7) to a temperature between 80 to 90° C.,
keeping the bobbin (7) at this temperature between 40 to 50 minutes, and
keeping the bobbin (7) under 700 mmHg vacuum between 25 to 35 minutes.

2. The Manufacturing method of a yarn (1) according to claim 1, characterized in that, the bobbin (7) is kept under 700 mmHg vacuum for 15 minutes during the first vacuum step after being placed in the fixing machine.

3. The Manufacturing method of a yarn (1) according to claim 1, characterized in that, temperature of the bobbin (7) is raised to 85° C.

4. The Manufacturing method of a yarn (1) according to claim 1, characterized in that, the bobbin (7) is kept at the temperature to which it was raised, for 45 minutes.

5. The Manufacturing method of a yarn (1) according to claim 1, characterized in that, the bobbin (7) is kept at 700 mmHg vacuum for 30 minutes after being kept at the temperature to which it was raised.

6. The Manufacturing method of a yarn (1) according to claim 1, characterized in that, one outer yarn (5) is wound on the core yarn (2) as s twist.

7. The Manufacturing method of a yarn (1) according to claim 1, characterized in that, one outer yarn (5) is wound on the core yarn (2) at 900 tpm (rounds) s twist.

8. The Manufacturing method of a yarn (1) according to claim 1, characterized in that, one outer yarn (5) is wound on the core yarn (2) at 600 tpm (rounds) s twist.

9. The Manufacturing method of a yarn (1) according to claim 1, characterized in that, more than one outer yarn (5) is wound on the core yarn (2) as s and z twisted alternating from inside to outside with the innermost being s twisted.

10. The method according to claim 1, wherein
the method produces a yarn (1) comprising a polyester core yarn (2), which is composed of 300 denier textured semi-dull yarn of 96 filaments and 150 denier textured semi-dull yarn of 48 filaments in a folded state; and a polyester outer yarn (5) wound on the core yarn (2), having a melting temperature lower than the melting temperature of the core yarn (2), which is 150 denier semi-dull fully drawn yarn of 48 filaments, wherein the core yarn (2) and the outer yarn (5) have been fixed.

11. The method according to claim 1, wherein the method produces a yarn (1) comprising 900 denier textured polyester core yarn (2); and 150 denier fully drawn polyester outer yarn (5) wound on the core yarn (2), having a melting temperature lower than the melting temperature of the core yarn (2), wherein the core yarn (2) and the outer yarn (5) have been fixed.

12. A manufacturing method of a fabric (8) for screening applications, characterized by the process steps:
setting up warps (9) using yarns (1),
arranging the warp (9) according to a weaving draft,
feeding double weft (10) using yarns (1)
wherein said yarns (1) are manufactured according to claim 1 and comprise a polyester core yarn (2), and at least one polyester outer yarn (5) wound on the core yarn (2), having a melting temperature lower than the melting temperature of the core yarn (2), and the core yarn (2) and the outer yarn (5) have being fixed.

13. The method according to claim 12, wherein the method produces a fabric (8) for screening applications comprising warps (9) and double wefts (10), characterized in that the warp (9) and weft (10) yarns comprise a polyester core yarn (2), and at least one polyester outer yarn (5) wound on the core yarn (2), having a melting temperature lower than the melting temperature of the core yarn (2), and the core yarn (2) and the outer yarn (5) being fixed.

14. The method according to claim 13, wherein the fabric is characterized in that warp (9) and weft (10) frequencies are 16 yarns (1) in each centimeter.

15. The method according to claim 13, wherein the fabric is characterized in that warp (9) and weft (10) frequencies are 14 yarns (1) in each centimeter.

* * * * *